(12) United States Patent
Chen

(10) Patent No.: US 7,974,023 B1
(45) Date of Patent: Jul. 5, 2011

(54) WAFER LEVEL OPTICAL LENS SUBSTRATE, WAFER LEVEL OPTICAL LENS MODULE AND FABRICATION METHOD THEREOF

(75) Inventor: Cheng-Heng Chen, Tainan County (TW)

(73) Assignee: Himax Semiconductor, Inc., Tainan (TW)

( * ) Notice: Subject to any disclaimer, the term of this patent is extended or adjusted under 35 U.S.C. 154(b) by 0 days.

(21) Appl. No.: 12/721,567

(22) Filed: Mar. 11, 2010

(51) Int. Cl.
*G02B 7/02* (2006.01)
*G02B 15/14* (2006.01)
*G02B 27/10* (2006.01)

(52) U.S. Cl. .................. 359/819; 359/700; 359/619

(58) Field of Classification Search .......... 359/694–700, 359/811–824, 619, 620
See application file for complete search history.

(56) References Cited

U.S. PATENT DOCUMENTS

| | | | |
|---|---|---|---|
| 6,707,613 B2 * | 3/2004 | Fujimoto et al. ............. | 359/622 |
| 6,985,298 B2 * | 1/2006 | Yamanaka et al. ............ | 359/619 |
| 7,397,486 B2 * | 7/2008 | Kurose et al. ................ | 347/135 |
| 7,561,336 B2 * | 7/2009 | Osaka et al. ................. | 359/619 |

* cited by examiner

*Primary Examiner* — Mohammed Hasan
(74) *Attorney, Agent, or Firm* — Jianq Chyun IP Office

(57) ABSTRACT

A wafer level optical lens substrate including a substrate and at least one lens is provided. The substrate has at least one through hole and at least one flange, wherein each flange is located on a side wall in each through hole. Each lens located in each through hole is embedded with each flange. A method of fabricating a wafer level optical lens substrate and a wafer level optical lens module are also provided respectively.

5 Claims, 11 Drawing Sheets

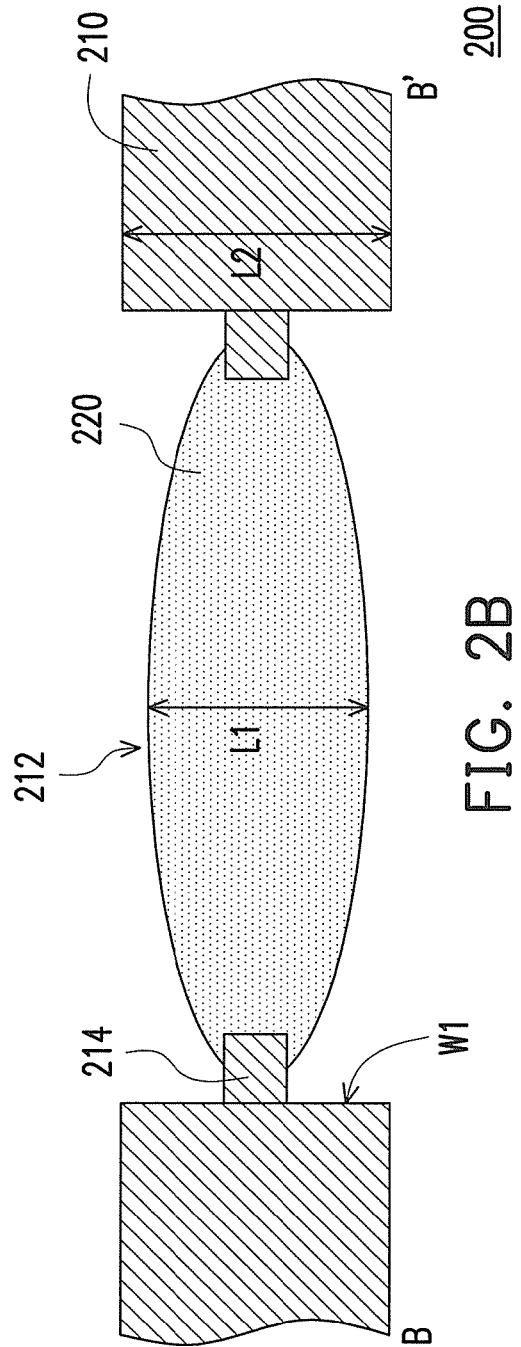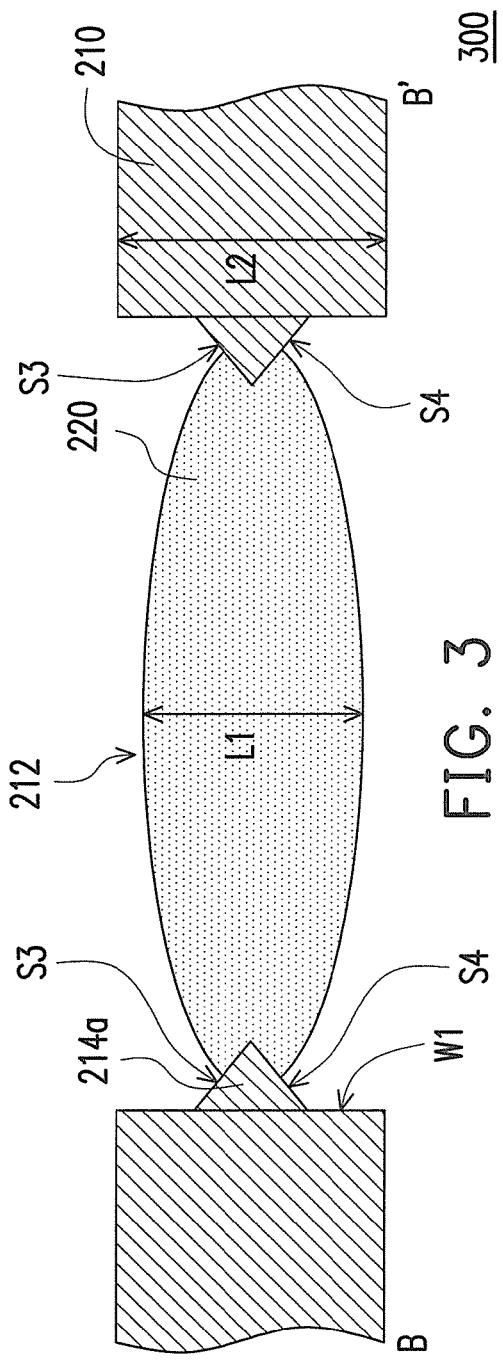

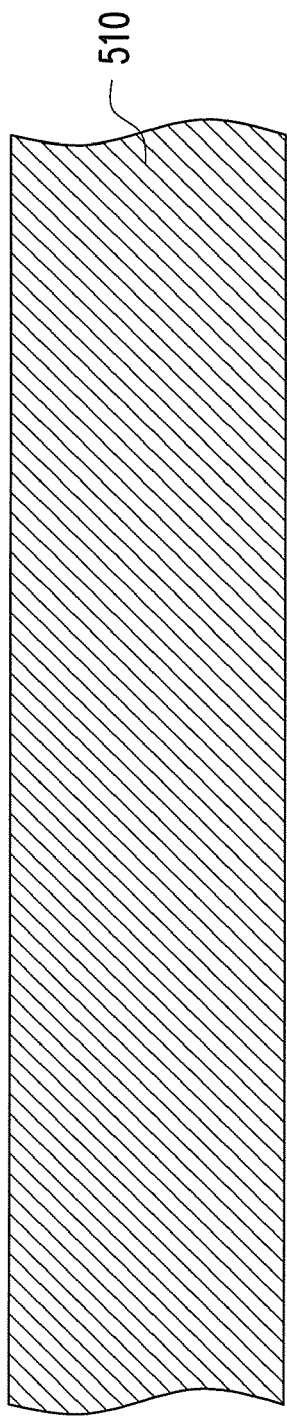
FIG. 5A
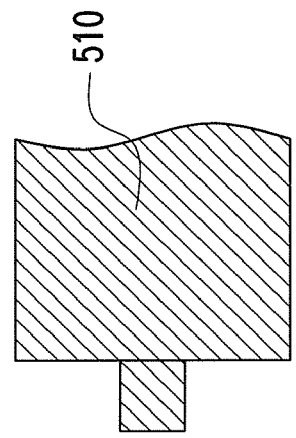
FIG. 5B
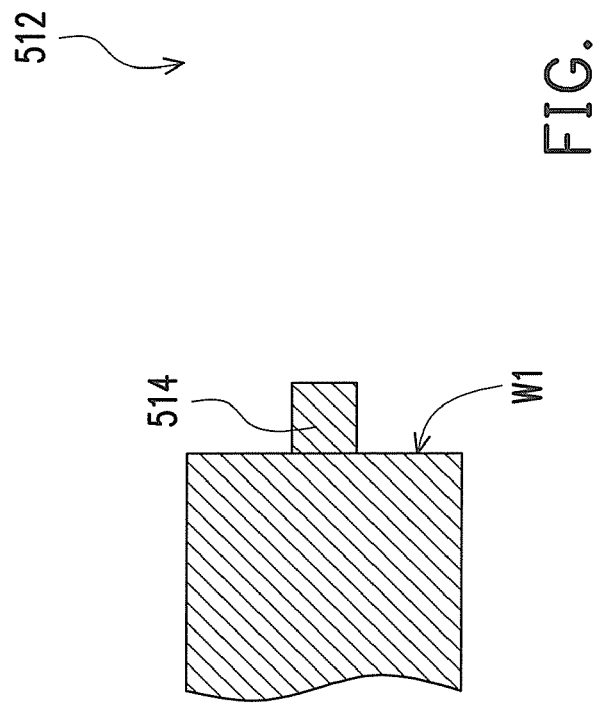

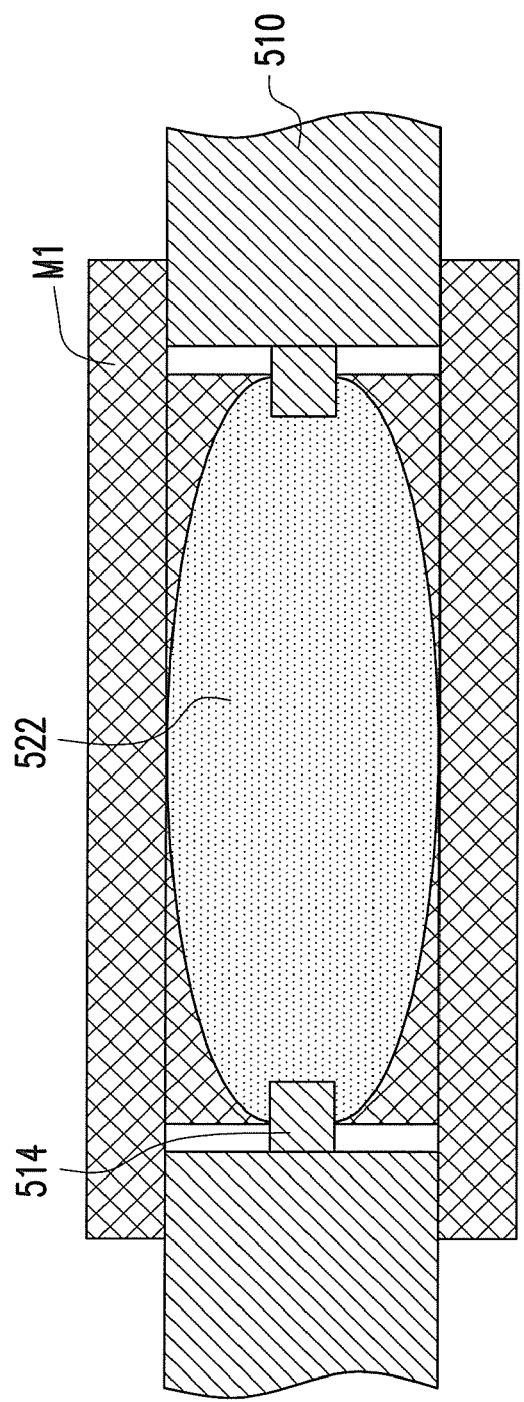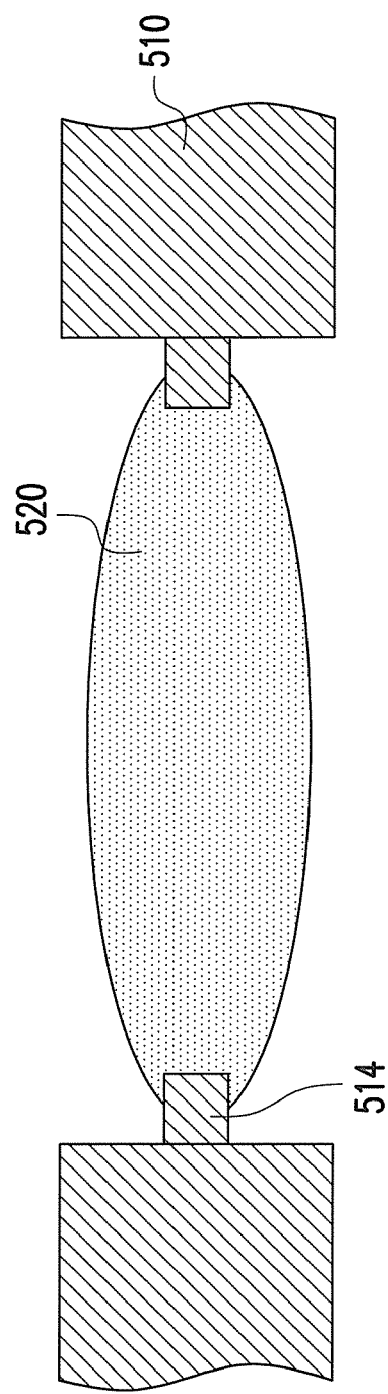
FIG. 5D
FIG. 5E

WAFER LEVEL OPTICAL LENS SUBSTRATE, WAFER LEVEL OPTICAL LENS MODULE AND FABRICATION METHOD THEREOF

BACKGROUND OF THE INVENTION

1. Field of the Invention

The invention relates to a lens substrate, a lens module, and a fabrication method thereof. More particularly, the invention relates to a wafer level optical lens substrate, a wafer level optical lens module, and a fabrication method thereof.

2. Description of Related Art

With the trend of miniaturizing modules and reducing prices of electronic products, the launch of the wafer level module technology has gained more attention. The wafer level module technology mainly adopts wafer level fabrication technique in electronic products to miniaturize volumes of electronic products and reduce fabrication costs. The wafer level module technology is also applied in the fabrication of wafer level optical lens modules, such that volumes of wafer level optical lens modules can be greatly reduced comparing to that of conventional lens modules. Wafer level optical lens modules are consequently utilized in camera modules of cellular phones, for example.

FIG. 1A is a top view schematically illustrating a portion of a conventional wafer level optical lens module. FIG. 1B is a cross-sectional view illustrating the portion of the wafer level optical lens module depicted in FIG. 1A taken along a sectional line AA'. Referring to FIG. 1A and FIG. 1B simultaneously, a conventional wafer level optical lens module 100 at least includes a lens substrate 110, a first spacer layer 120, a second spacer layer 130, and a pair of substrates 142, 144. The lens substrate 110 has a transparent substrate 112 and at least one lens 114 disposed on both sides of the transparent substrate 112. The lens substrate 110 is located between the pair of substrates 142, 144. The first spacer layer 120 is located between the substrate 142 and the transparent substrate 112 to maintain a first space S1. Moreover, the second spacer layer 130 is located between the substrate 144 and the transparent substrate 112 to maintain a second space S2. The lens 114 is located between the first space S1 and the second space S2, as shown in FIG. 1B.

In the wafer level optical lens module 100, the lens substrate 110 and the spacer layers 120, 130 each adopts an independent substrate. Thus, alignment shift may occur during an adhesion of the lens substrate 110, the substrates 142, 144, and the spacer layers 120, 130 in package alignment, thereby reducing reliability of the fabrication of the wafer level optical lens module 100. In addition, the spacer layers 120, 130 usually adopt transparent materials such as glass or plastics. Therefore, when the wafer level optical lens module 100 performs optical imaging, the stray light passes through the spacer layers easily and cannot be isolated effectively. As a consequence, the noise ratio becomes too high and imaging quality cannot be enhanced effectively.

Furthermore, in the process of fabricating the wafer level optical lens module 100, the lens substrate 110 and the spacer layers 120, 130 each adopts an independent substrate, so that the fabrication costs cannot be reduced easily.

SUMMARY OF THE INVENTION

Accordingly, the invention is directed to a wafer level optical lens substrate with superior imaging quality during imaging and cheaper fabrication costs.

The invention is further directed to a method of fabricating a wafer level optical lens substrate, where the wafer level optical lens substrate aforementioned is fabricated with this method.

The invention is further directed to a wafer level optical lens module adopting the wafer level optical lens substrate, so as to result in superior imaging quality during imaging and cheaper fabrication costs.

The invention is further directed to a wafer level optical lens substrate including a substrate and at least one lens. The substrate has at least one through hole and at least one flange. Each flange is located on a side wall in each through hole. Each lens is located in each through hole and embedded with each flange.

According to one embodiment of the invention, the substrate has a first surface and the first surface has at least one alignment hole disposed thereon. According to one embodiment of the invention, the substrate has a second surface opposite to the first surface. The second surface has an alignment protrusion disposed thereon and arranged oppositely to each alignment hole.

According to one embodiment of the invention, the substrate has a first surface and the first surface has at least one alignment protrusion disposed thereon.

According to one embodiment of the invention, the flange located on each side wall is a cuboid. According to one embodiment of the invention, the flange located on each side wall is a trigonal prism. According to one embodiment of the invention, the trigonal prism has a first inclined plane and a second inclined plane connected to the first inclined plane.

According to one embodiment of the invention, a material of the substrate is a light-shielding material or a light-absorbing material. According to one embodiment of the invention, the light-shielding material is a black colloid.

According to one embodiment of the invention, the lens is a convex lens or a concave lens.

The invention is further directed to a method of fabricating the wafer level optical lens substrate. The method includes the following steps. Firstly, a substrate is provided. Next, at least one through hole is formed on the substrate and a flange is formed on a side wall in each through hole. A lens is then formed on the flange of each through hole and the lens is embedded with the flange.

According to one embodiment of the invention, the through hole and the flange located on the side wall are formed by using a computer numerical control (CNC) technique, a punching process, or a laser scriber technique.

According to one embodiment of the invention, a method of forming the lens on the flange of each through hole and embedding the lens with the flange includes the following steps. Firstly, a tenon mold is leaned on the flange. A transparent material is subsequently injected into the tenon mold. Next, the transparent material is cured to form the lens. Thereafter, the tenon mold is removed.

According to one embodiment of the invention, the substrate has a first surface and a second surface opposite to the first surface. In the method of fabricating the wafer level optical lens substrate, at least one alignment hole is further formed on the first surface and an alignment protrusion opposite to each alignment hole is further formed on the second surface.

The invention is further directed to a wafer level optical (WLO) lens module including a first wafer level optical lens substrate and a second wafer level optical lens substrate. The first wafer level optical lens substrate includes a first substrate and at least one first lens. The first substrate has at least one first through hole and at least one first flange. Each first flange is located on a side wall in each first through hole. The first substrate has a first surface and the first surface has an alignment protrusion disposed thereon. Each first lens is located in each first through hole and embedded with each first flange. The second wafer level optical lens substrate is connected to the first wafer level optical lens substrate. The second wafer level optical lens substrate includes a second substrate and at least one second lens. The second substrate has at least one second through hole and at least one second flange. Each second flange is located on a side wall in each second through hole. The second substrate has a second surface and the second surface has at least one alignment hole disposed thereon and arranged oppositely to each alignment protrusion. Each second lens is located in each second through hole and embedded with each second flange. The first alignment protrusion of the first wafer level optical lens substrate is embedded with the second alignment hole of the second wafer level optical lens substrate to connect the first wafer level optical lens substrate and the second wafer level optical lens substrate.

According to one embodiment of the invention, the first flange or the second flange located on each side wall is a cuboid or a trigonal prism.

According to one embodiment of the invention, the first lens and the second lens each includes a convex lens or a concave lens.

In summary, the wafer level optical lens substrate of the invention forms at least one through hole on the substrate and forms a flange on a side wall in each through hole, so that the lens and the flange are embedded to each other. Hence, the use of transparent substrate is omitted when comparing to the conventional technique so as to reduce the fabrication costs. Moreover, the lens is located within the through hole, the stray light in the periphery thus does not pass through the lens located within the through hole easily. The imaging quality of the wafer level optical lens substrate is enhanced as a consequence. Additionally, by adopting a non-transparent material in the substrate, the stray light in the periphery is further prevented from passing through the lens located in the through hole, such that the imaging quality of the wafer level optical lens substrate is further enhanced.

Furthermore, the invention is also directed to an aforementioned wafer level optical lens substrate with the advantages mentioned above. The invention is further directed to a wafer level optical lens module adopting the wafer level optical lens substrate, where the wafer level optical lens module also has these advantages.

In order to make the aforementioned and other features and advantages of the invention more comprehensible, several embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2B is a cross-sectional view illustrating a portion of the wafer level optical lens substrate depicted in FIG. 2A taken along a sectional line AA'.

FIG. 3 is a cross-sectional view illustrating a portion of a wafer level optical lens substrate in another embodiment of the invention.

FIGS. 5A~5E illustrate a flowchart of fabricating a portion of a wafer level optical lens substrate in one embodiment of the invention.

DESCRIPTION OF EMBODIMENTS

Figure 1A:
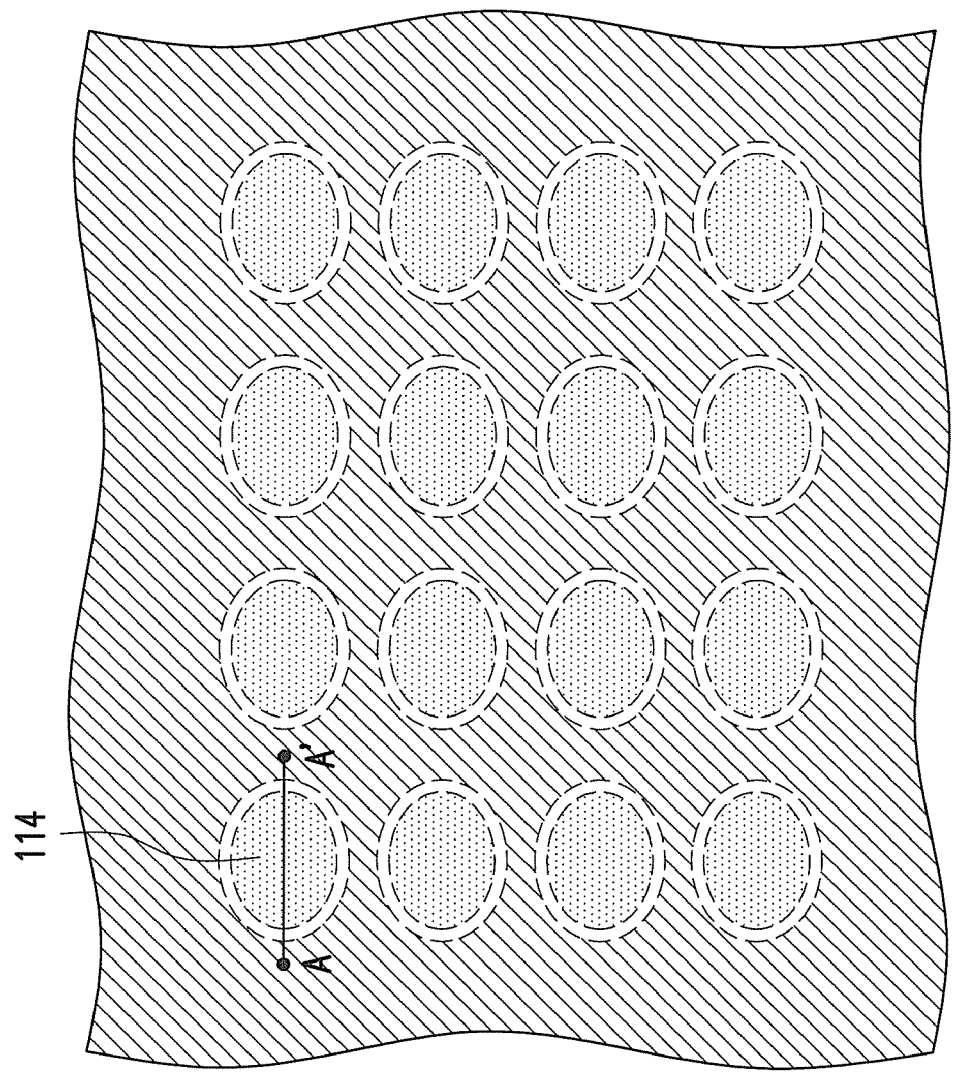
FIG. 1A is a top view schematically illustrating a portion of a conventional wafer level optical lens module.
Figure 1B:
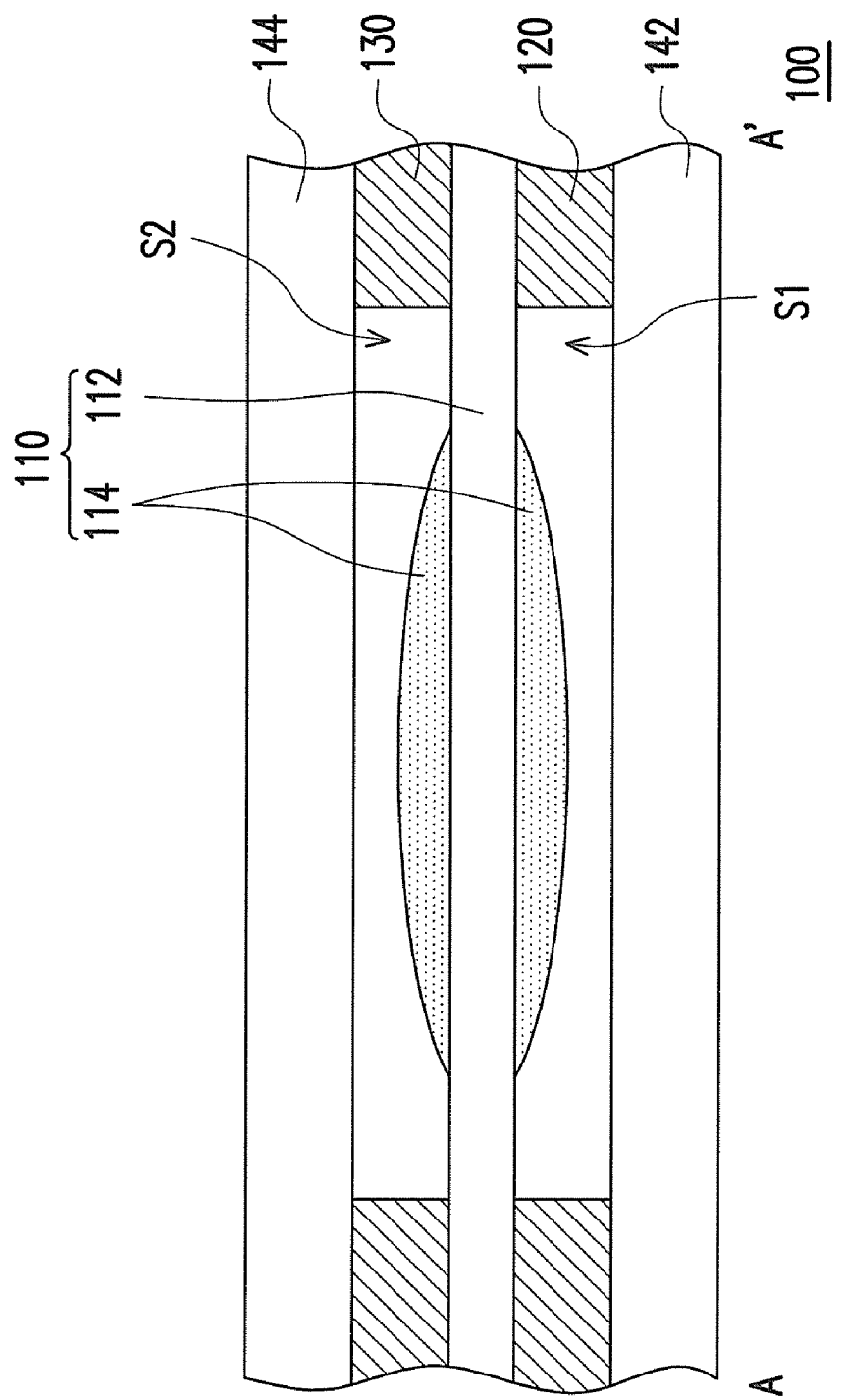
FIG. 1B is a cross-sectional view illustrating the portion of the wafer level optical lens module depicted in FIG. 1A taken along a sectional line AA'.
Figure 2A:
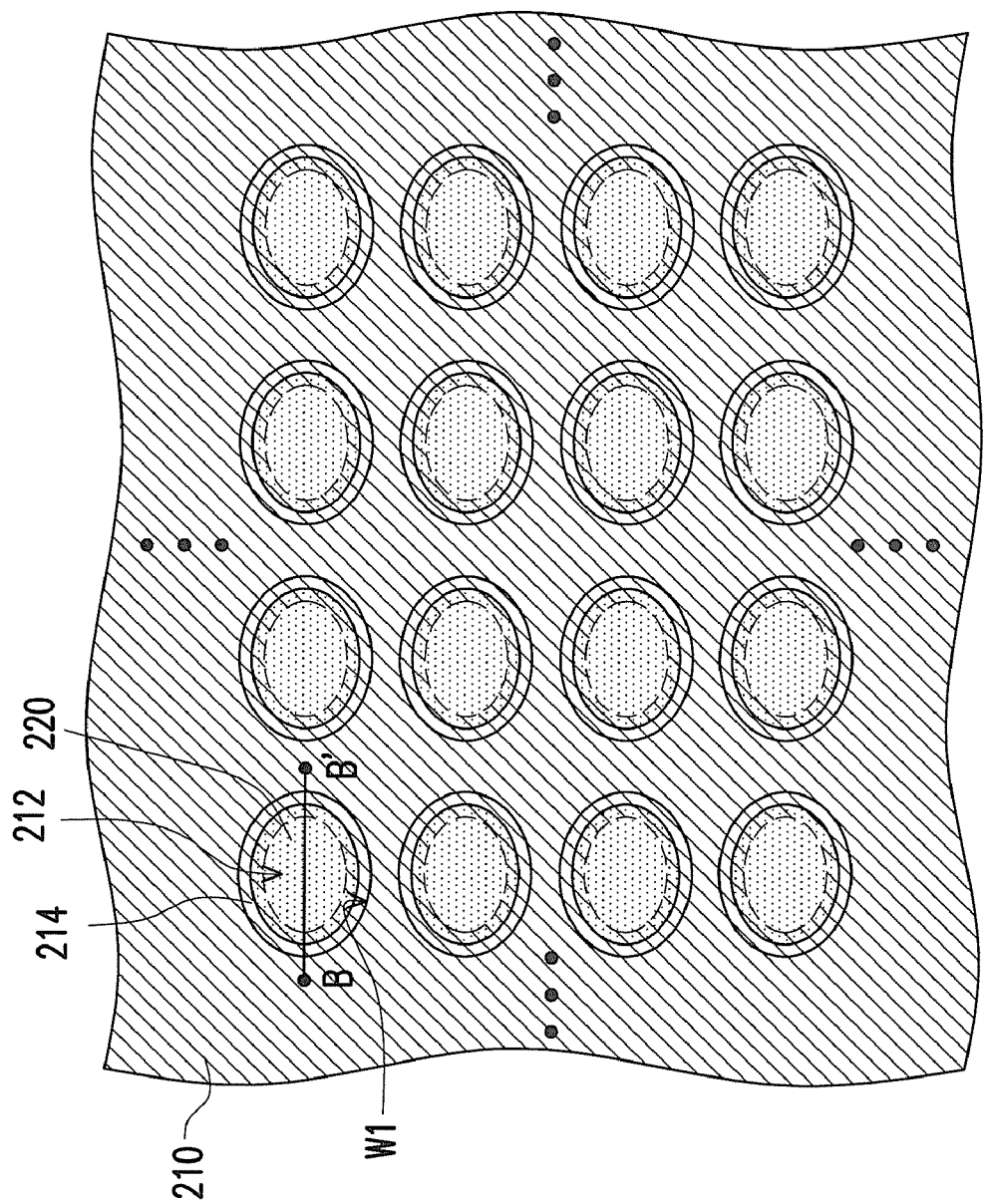
FIG. 2A is a schematic top view of a wafer level optical lens substrate in one embodiment of the invention.

FIG. 2A is a schematic top view of a wafer level optical lens substrate in one embodiment of the invention. FIG. 2B is a cross-sectional view illustrating a portion of the wafer level optical lens substrate depicted in FIG. 2A taken along a sectional line AA'. Referring to FIG. 2A and FIG. 2B, a wafer level optical lens substrate 200 of the present embodiment includes a substrate 210 and at least one lens 220. The substrate 210 has at least one through hole 212 and at least one flange 214. Each flange 214 is located on a side wall W1 in each through hole 212.

In the present embodiment, the substrate 210 adopts a light-shielding material or a light-absorbing material, for example. For instance, the light-shielding material is a black colloid. Moreover, the flange 214 located on each side wall W1 is a cuboid, such as a rectangular flange shown in FIG. 2B.

Each lens 220 is located in each through hole 212 and embedded with each flange 214. In addition, a thickness L1 of each lens 220 is less than a thickness L2 of the substrate 210, as illustrated in FIG. 2B. In the present embodiment, the lens 220 is a convex lens, a concave lens, or a combination thereof depending on the design and demands of the user. The convex lens illustrated in FIG. 2B is used as an exemplary example in the present embodiment; however, the invention is not limited thereto. In addition, the lens 220 also adopts plastic material, glass material, or other suitable transparent materials. The present embodiment merely utilizes plastic material as an example, but the invention is not limited thereto.

In the present embodiment, since the substrate 210 adopts a non-transparent material (i.e. the light-shielding material or the light-absorbing material), the stray light in the periphery is further prevented from passing through the lens 220 located in the through hole 212, such that the optical quality of the wafer level optical lens substrate, such as the quality of lens imaging, is further enhanced. Further, the lens 220 is embedded with the flange 214 located in the through hole 212. In other words, comparing to the conventional technique which forms the lens on the transparent substrate, the wafer level optical lens substrate 200 of the present embodiment omits the use of the transparent substrate, thereby reducing the fabrication costs.

Additionally, the lens 220 is located in the through hole 212, and the thickness L1 of the lens 220 is less than the thickness L2 of the substrate 210. Thus, the thickness L2 of the substrate on both sides of the lens 220 has a function similar to that of spacer layers in the conventional technique.

Consequently, when the wafer level optical lens substrate 200 adheres with other substrates, a space is maintained between the lens 220 and other substrates to prevent damaging of the lens 220 caused by colliding with other substrates in the adhering process. Also, the thickness L2 of the substrate 210 can be suitably designed to satisfy a focal length or an imaging distance of the lens 220. In other words, the wafer level optical lens substrate 200 of the present embodiment mainly adopts the structure of the substrate 210 shown in FIG. 2B. However, the wafer level optical lens substrate 200 also includes structures and functions similar to those of the spacer layers and the transparent substrate in the conventional technique (that is, applying a concept similar to integrating the spacer layers and the transparent substrate). As a result, an alignment shift which occurs during the adhesion of the traditional spacer layers and transparent substrate can be avoided.

In another embodiment, the flange 214 also adopts a design of a flange 214a illustrated in FIG. 3, thereby forming another wafer level optical lens substrate 300. In FIG. 3, the wafer level optical lens substrate 300 and the wafer level optical lens substrate 200 have similar structures. However, the two wafer level optical lens substrates are different in that the flange 214a represents a trigonal prism. Specifically, the trigonal prism has a first inclined plane S3 and a second inclined plane S4 connected to the first inclined plane S3. Therefore, when imaging with the wafer level optical lens substrate 300, an angle of the light entering the lens 220 can be increased. That is, the peripheral light can also be reflected by the first inclined plane S3 or the second inclined plane S4 so as to enhance the overall brightness and quality of the image.

Figure 4A:
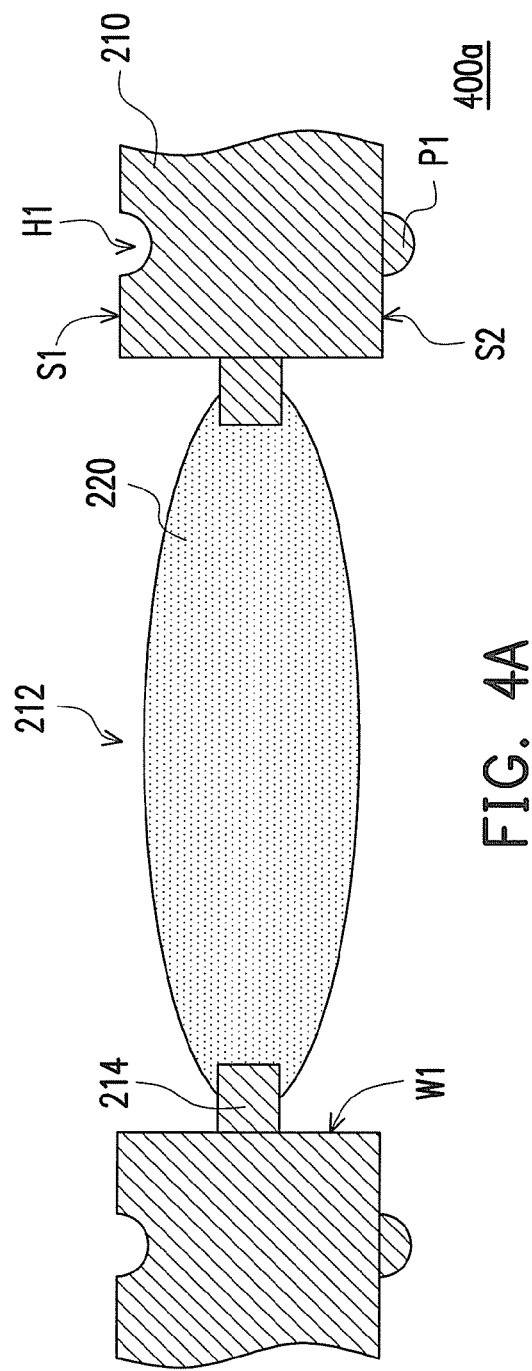
FIGS. 4A~4C are cross-sectional views illustrating a wafer level optical lens substrate in another embodiment of the invention.
Figure 4B:
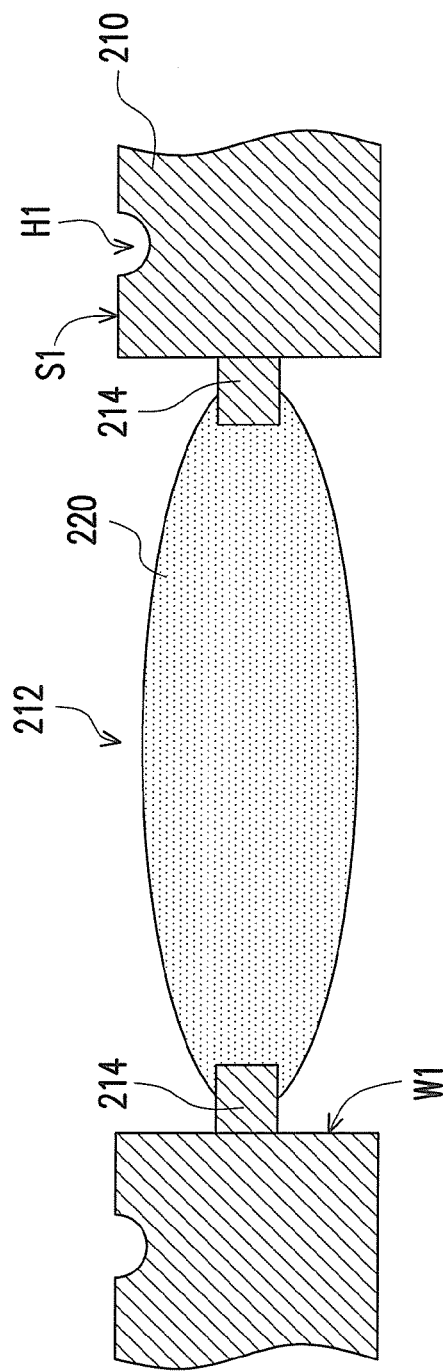
Figure 4C:
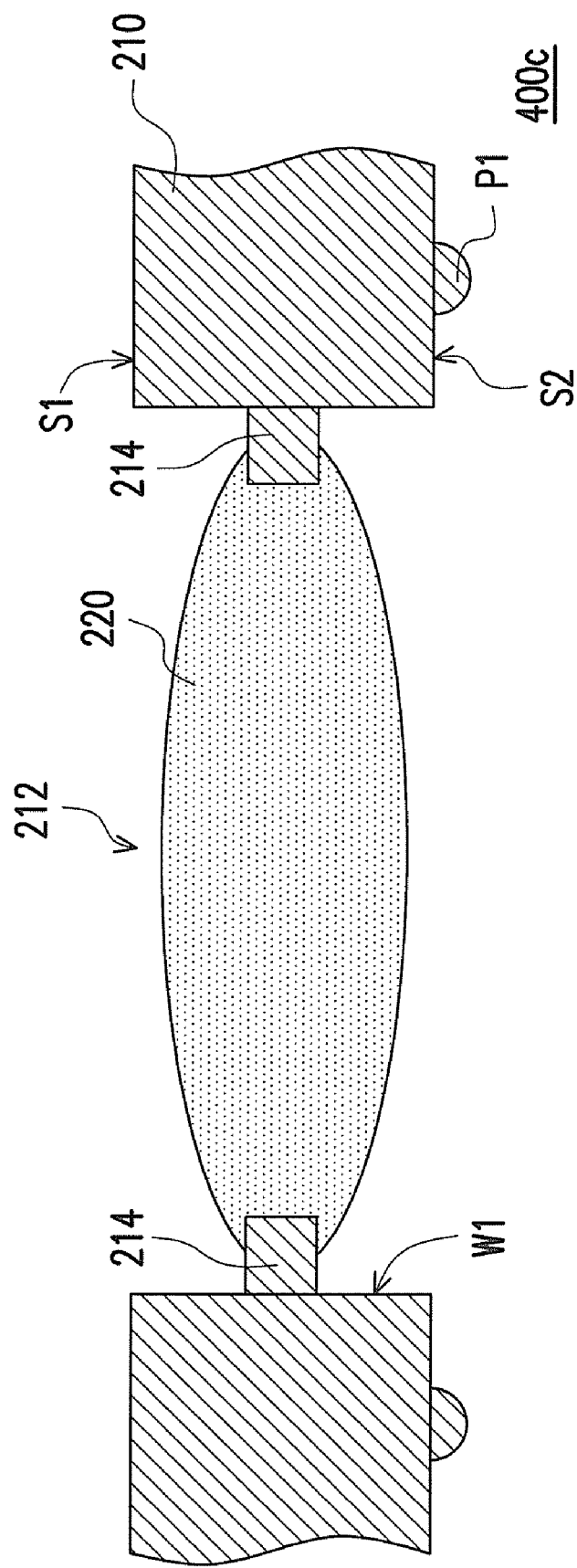

FIGS. 4A~4C are cross-sectional views illustrating a portion of a wafer level optical lens substrate in another embodiment of the invention. Referring to FIG. 2B and FIGS. 4A~4C simultaneously, wafer level optical lens substrates 400a, 400b, 400c, and the wafer level optical lens substrate 200 have similar structures. However, each substrate 210 of the wafer level optical lens substrates 400a, 400b, 400c has a first surface S1 and a second surface S2 opposite to the first surface S1. Here, the first surface S1 has at least one alignment hole H1 disposed thereon and the second surface S2 has an alignment protrusion P1 disposed thereon and arranged oppositely to each alignment hole H1, such that structures illustrated in FIGS. 4A~4C are presented in different embodiments. The alignment hole H1 and the alignment protrusion P1 are mainly used for aligning a plurality of wafer level optical lens substrates and assembling the wafer level optical lens substrates. More detailed embodiments can refer to descriptions regarding structures of wafer level optical lens modules in the following.

Accordingly, the invention is further directed to a method of fabricating the wafer level optical lens substrate, and the method is depicted below.

Figure 5C:
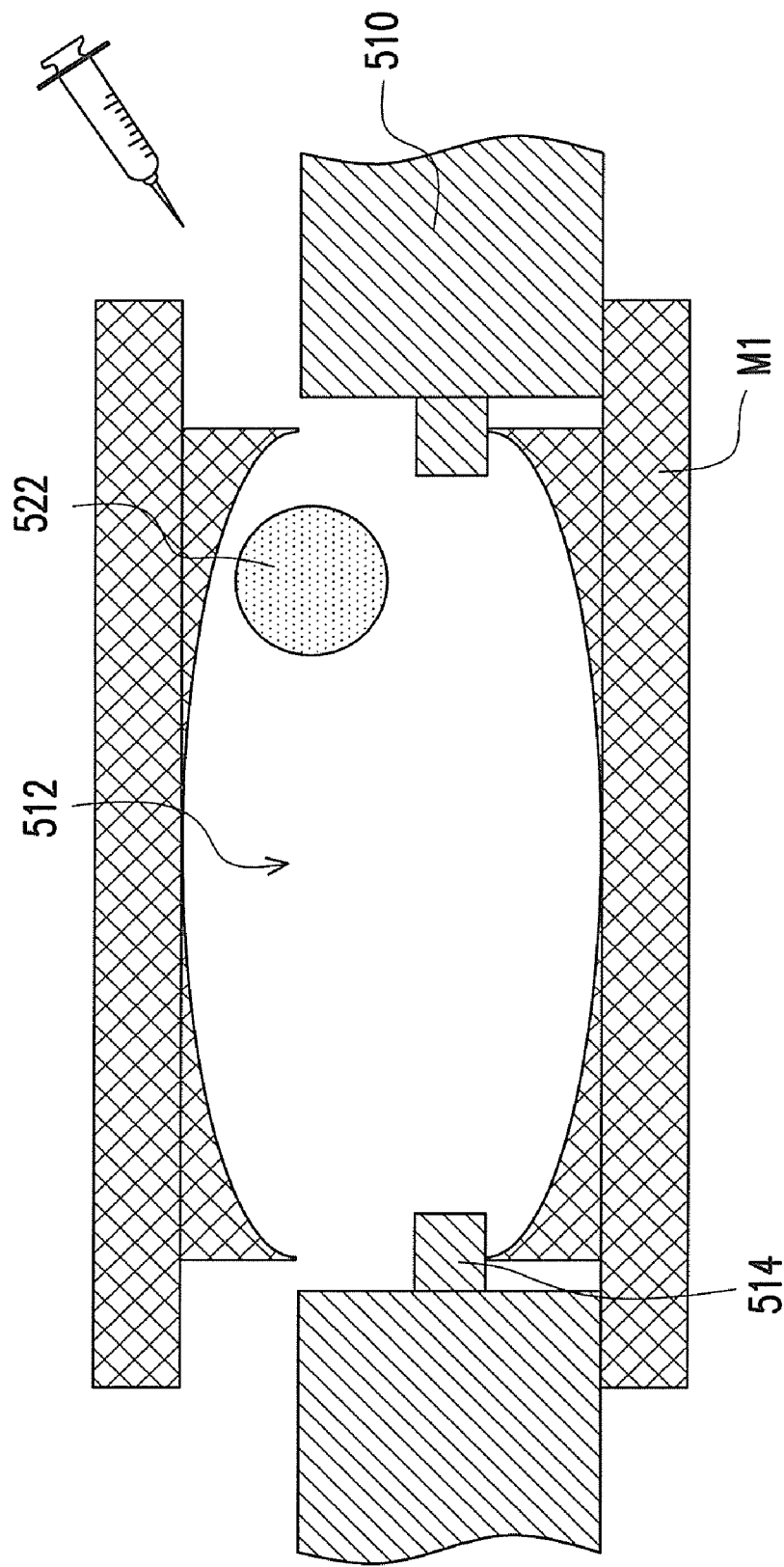

FIGS. 5A~5E illustrate a flowchart of fabricating a wafer level optical lens substrate in one embodiment of the invention. Referring to FIG. 5A, firstly, a substrate 510 is provided. The substrate 510 is made of a light-shielding material or a light-absorbing material, for example. For instance, the light-shielding material is a black colloid.

Next, at least one through hole 512 is formed on the substrate 510 and a flange 514 is formed on a side wall W1 in each through hole 512 as shown in FIG. 5B. In the present embodiment, the through hole 512 and the flange 514 located on the side wall W1 are formed by using a computer numerical control (CNC) technique, a punching process, or a laser scriber technique.

A lens 520 is then formed on the flange 514 in each through hole 512 and the lens 520 is embedded with the flange 514 as illustrated in FIGS. 5C to 5E. More specifically, a tenon mold M1 is leaned on the flange 514, for example, and a transparent material 522 is injected into the tenon mold M1, as depicted in FIG. 5C. Afterwards, as shown in FIG. 5D, the transparent material 522 is cured to form the lens 520. Finally, the tenon mold M1 is removed as illustrated in 5E, and the method of forming the lens 520 on the flange 514 is generally completed. Moreover, the method of fabricating the wafer level optical lens substrate 200 is mostly completed by performing the steps in FIGS. 5A~5E.

In one embodiment, when at least one alignment hole (not illustrated) is formed on a first surface (not illustrated) of the substrate 510, or when an alignment protrusion (not shown) opposite to each alignment hole is formed on a second surface (not shown), the wafer level optical lens substrates 400a, 400b, 400c shown in FIG. 4A, FIG. 4B, and FIG. 4C are then formed.

Figure 6A:
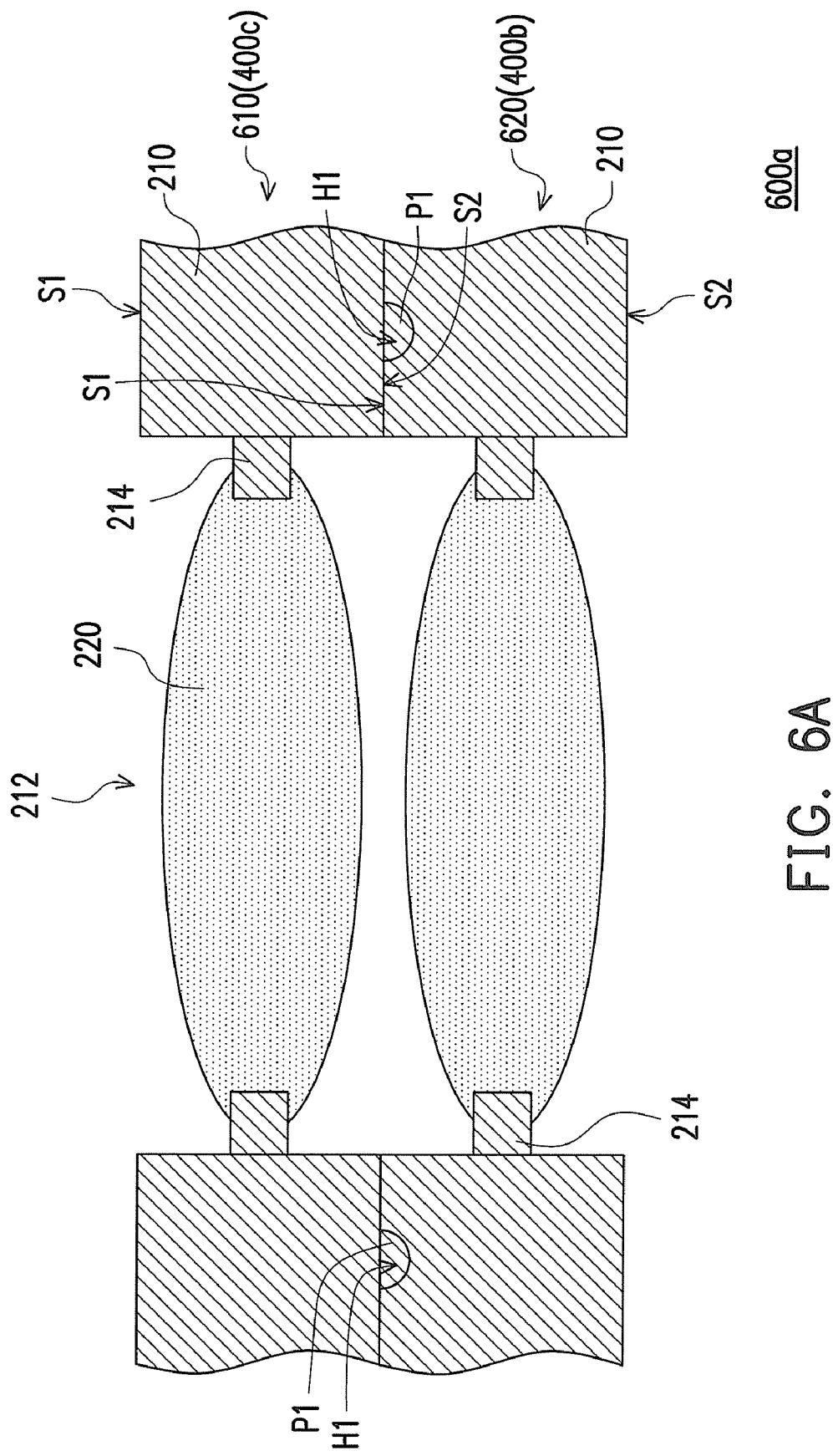
FIG. 6A is a cross-sectional view illustrating a portion of a wafer level optical lens module in one embodiment of the invention.

Accordingly, the invention is further directed to a wafer level optical lens module (WLO lens module) as depicted in FIG. 6A. A wafer level optical lens module 600a of the present embodiment includes a first wafer level optical lens substrate 610 and a second wafer level optical lens substrate 620. The first wafer level optical lens substrate 610 and the second wafer level optical lens substrate 620, for instance, adopt the structures of the wafer level optical lens substrate 400c and the wafer level optical lens substrate 400b respectively. As shown in FIG. 6A, the first alignment protrusion P1 of the first wafer level optical lens substrate 610 is embedded with the second alignment hole H1 of the second wafer level optical lens substrate 620 to connect the first wafer level optical lens substrate 610 and the second wafer level optical lens substrate 620 so as to form a structure of a wafer level optical lens module 600a. At this time, the wafer level optical lens module 600a is packaged with the use of a transparent substrate, and a sensor is further combined to foam a wafer level imaging system module. In the present embodiment, since the wafer level optical lens substrates 610, 620 adopt structures similar to the wafer level optical lens substrates 200, 300, 400a, 400b, 400c, the wafer level optical lens module 600a also has the advantages mentioned above.

Figure 6B:
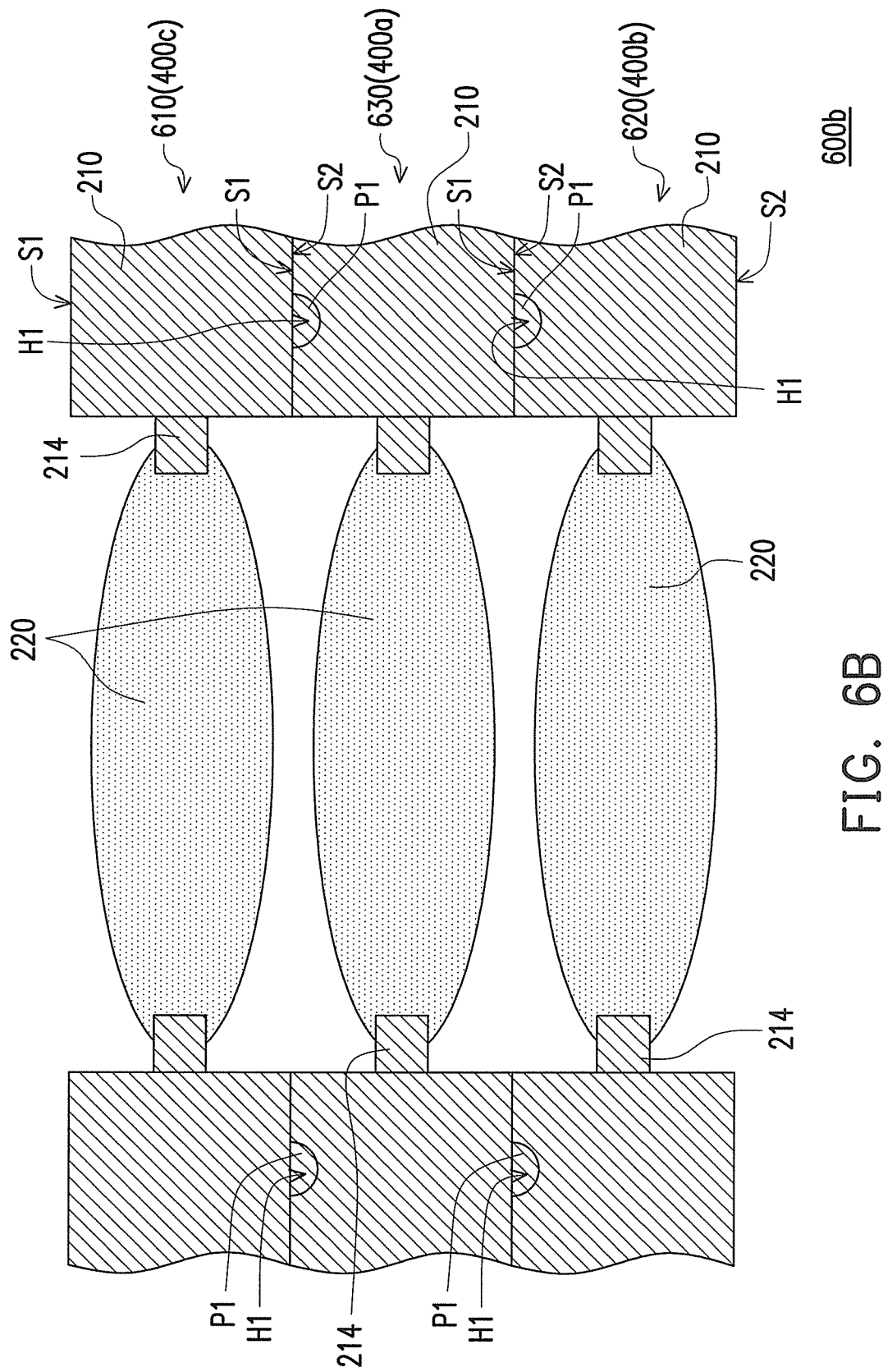
FIG. 6B is a cross-sectional view illustrating a portion of a wafer level optical lens module in another embodiment of the invention.

In another embodiment, another wafer level optical lens module 600b can also be formed by combining other possible wafer level optical lens substrates 400a, 400b, 400c, as shown in FIG. 6B. The wafer level optical lens module 600b and the wafer level optical lens module 600a have similar structures. However, the wafer level optical lens module 600b further includes a third wafer level optical lens substrate 630. The third wafer level optical lens substrate 630 is located between the first wafer level optical lens substrate 610 and the second wafer level optical lens substrate 620. In the present embodiment, the third wafer level optical lens substrate 630 utilizes the structure of the wafer level optical lens substrate 400a. Thus, the third wafer level optical lens substrate 630 is capable of connecting with the first wafer level optical lens substrate 610 and the second wafer level optical lens substrate 620 through the alignment hole H1 and the alignment protrusion P1, thereby forming a structure of the wafer level optical lens module 600b as shown in FIG. 6B.

Similarly, when the wafer level optical lens module 600b is packaged with the use of a transparent substrate and a sensor is further combined thereinto, another wafer level imaging system module can then be formed. In the present embodiment, since the wafer level optical lens substrates 610, 620, 630 adopt structures similar to the wafer level optical lens substrates 200, 300, 400*a*, 400*b*, 400*c*, the wafer level optical lens module 600*b* also has the advantages mentioned above.

In summary, as the wafer level optical lens substrate adopts a non-transparent material for the substrate and the lens is located in the through hole, the stray light in the periphery thus does not pass through the lens located in the through hole easily. The imaging quality of the wafer level optical lens substrate is enhanced as a consequence. Furthermore, the lens is embedded with the flange located in the through hole. In other words, comparing to the conventional technique which forms the lens on the transparent substrate, the wafer level optical lens substrate of the invention omits the use of the transparent substrate, thereby reducing the fabrication costs.

Additionally, the lens is located in the through hole and the thickness of the lens is less than the thickness of the substrate. The thickness of the substrate on both sides of the lens consequently has a function similar to that of spacer layers. Therefore, when the wafer level optical lens substrate adheres with other substrates, a space is maintained between the lens and other substrates to prevent damaging of the lens caused by colliding with other substrates. Hence, the substrate structure of the wafer level optical lens substrate of the invention has the structures and functions similar to those of the spacer layers and the transparent substrate in the conventional techniques (that is, adopting a concept similar to integrating the spacer layers and the transparent substrate). As a result, an alignment shift which occurs during the adhesion of the traditional spacer layers and transparent substrate can be avoided.

The invention is also directed to an aforementioned wafer level optical lens substrate with the advantages mentioned above. Also, the invention is directed to a wafer level optical lens module adopting the wafer level optical lens substrate, where the wafer level optical lens module also has these advantages.

Although the invention has been described with reference to the above embodiments, it is apparent to one of ordinary skill in the art that modifications to the described embodiments may be made without departing from the spirit of the invention. Accordingly, the scope of the invention is defined by the attached claims not by the above detailed descriptions.

What is claimed is:

1. A wafer level optical lens module, comprising:
    a first wafer level optical lens substrate, comprising:
        a first substrate, having at least one first through hole and at least one first flange, wherein each first flange is located on an side wall in each first through hole, and the first substrate has a first surface and the first surface has an alignment protrusion disposed thereon;
        at least one first lens, each located within each first through hole and embedded with each first flange, and a thickness of each first lens being less than a thickness of the first substrate;
    a second wafer level optical lens substrate, connected to the first wafer level optical lens substrate, the second wafer level optical lens substrate comprising:
        a second substrate, having at least one second through hole and at least one second flange, wherein each second flange is located on a side wall in each second through hole, and the second substrate has a second surface and the second surface has at least one alignment hole disposed thereon and arranged oppositely to each alignment protrusion; and
        at least one second lens, each located within each second through hole and embedded with each second flange, and a thickness of each second lens being less than a thickness of the second substrate,
    wherein the first alignment protrusion of the first wafer level optical lens substrate is embedded with the second alignment hole of the second wafer level optical lens substrate to connect the first wafer level optical lens substrate and the second wafer level optical lens substrate.

2. The wafer level optical lens module as claimed in claim 1, wherein a shape of the first flange or the second flange located on each side wall is a cuboid or a trigonal prism.

3. The wafer level optical lens module as claimed in claim 1, wherein a material of the substrate is a light-shielding material or a light-absorbing material.

4. The wafer level optical lens module as claimed in claim 3, wherein the light-shielding material is a black colloid.

5. The wafer level optical lens module as claimed in claim 1, wherein the first lens and the second lens each comprises a convex lens or a concave lens.

* * * * *